(12) United States Patent
May et al.

(10) Patent No.: US 7,601,964 B2
(45) Date of Patent: Oct. 13, 2009

(54) METHOD AND APPARATUS FOR PULSED UV MEASUREMENT

(75) Inventors: Joe T. May, Leesburg, VA (US); Matthew J. McConnell, Ashburn, VA (US); David C. Snyder, Frederick, MD (US)

(73) Assignee: Electronic Instrumentation & Technology, Inc., Sterling, VA (US)

( * ) Notice: Subject to any disclaimer, the term of this patent is extended or adjusted under 35 U.S.C. 154(b) by 234 days.

(21) Appl. No.: 11/733,516

(22) Filed: Apr. 10, 2007

(65) Prior Publication Data

US 2008/0251731 A1    Oct. 16, 2008

(51) Int. Cl.
*G01J 1/42* (2006.01)
(52) U.S. Cl. .................. 250/372; 250/365; 250/370.01
(58) Field of Classification Search .............. 250/365, 250/372, 370.01
See application file for complete search history.

(56) References Cited

U.S. PATENT DOCUMENTS 6,901,337 B2 * 5/2005 Tanaka et al. ................. 702/60
7,411,198 B1 * 8/2008 Holland et al. ......... 250/370.01

* cited by examiner

*Primary Examiner*—Constantine Hannaher
*Assistant Examiner*—Casey Bryant
(74) *Attorney, Agent, or Firm*—Whitham Curtis Christofferson & Cook, PC

(57) ABSTRACT

A detector receives energy pulses and a lossy integration circuit generates a lossy integration that, for each pulse, increases over the pulse duration to a maximum value and then decays. The lossy integration is sampled, with a sampling rate and decay rate such that the sample is within a given acceptable error of the maximum value. The sample represents the pulse total energy, within the given acceptable error. An optional circuit and processing function calculates a total accumulated energy over a plurality of pulses.

9 Claims, 5 Drawing Sheets

METHOD AND APPARATUS FOR PULSED UV MEASUREMENT

FIELD OF THE INVENTION

The field of the invention is pulsed light generation and measurement of received light and, more specifically, a measurement and control of a pulsed ultraviolet light.

BACKGROUND OF THE INVENTION

High power ultraviolet (UV) light has known uses in various fields including, without limitation curing certain coatings, other resin-type materials and adhesives, and disinfecting medical devices and fluids such as, for example, water.

Known UV light sources include mercury vapor lamps, which generate continuous light, and pulse or flash-type sources, which typically generate UV light pulses by employing, for example, inert flash tubes.

Commercially available pulse UV sources can generate power levels of, for example, 1,000 watts-per-centimeter squared ($w/cm^2$) peak power. Such power levels, for example, provide penetration through transparent protective layers covering a UV-curable material, with sufficient power for relatively quick curing of the material. An example is UV curing of layers of Blu-ray discs, comprising a transparent protective layer approximately 100 µm thick covering a UV-curable layer, which is formulated to absorb and be curable by light of a wavelength of approximately 180-600 nm.

Related art UV sources and related systems, however, have shortcomings. Mercury vapor and other continuous-type UV sources are inherently inefficient in terms of electrical power consumed versus UV light power generated. The inefficiency is due to much of the electrical power being generated as heat, or as light frequencies outside of the desired UV spectrum.

Pulse-type UV light sources are generally more efficient, in terms of UV power radiated compared to electrical power consumed than continuous-type UV sources. However, current methods and devices for measuring the radiated UV pulse power are relatively expensive, overly large, or not sufficiently accurate, particularly for the increasingly narrow UV pulse widths that are being used. One less expensive method and device for measuring UV pulse power employs "integrate and reset" method which connects an analog integrator to the photo-detector output and integrates that output over a time window spanning multiple UV pulses. At the end of the time window the integrator is sampled by an A/D converter and then discharged or reset. The A/D sample is the total accumulated energy of all of the UV pulses received by the photodetector over the time window. After the reset, the integrator integrates another sequence of multiple pulses, over another time window. At the end of the window, the integrator is sampled again, reset and the cycle repeats. The width of the time window is such that the integrator does not saturate.

One shortcoming of the integrate-and-reset device is that it measures only an accumulated energy of multiple pulses over a given time window. It does not provide measurement of individual pulse energy. Another shortcoming of the integrate-and-reset device is the finite range of the integrator, which necessitates setting the sample-and-reset window short enough so that, at least statistically, the accumulated energy of the UV pulses received over the window does not saturate the integrator. Still another shortcoming of the integrate-and-reset device is that stable integrators are often difficult to implement. Another shortcoming is error caused by leakage or bleed-off of the integrator over the span of the integration window.

SUMMARY OF THE INVENTION

Accordingly, one object of one or more of the embodiments is to provide an economical, accurate and easily implemented system and method to measure the energy of UV pulses.

A further object of one or more of the embodiments is to provide an economical, accurate and easily implemented system and method to measure and store the accumulated energy of UV pulses received over a selectable time window, extending substantially any length.

A further object of one or more of the embodiments is to provide an economical, accurate and easily implemented system and method to measure the per pulse energy of UV pulses.

One aspect integrates each received pulse to generate an integration signal that increases for the duration of the pulse and then decays commencing with the end of the pulse. The maximum, which is the accumulated value at the end of the pulse represents the pulse's total energy. An analog-to-digital converter (ADC) samples the integrator output. The integrator is a lossy integrator having a decay. The decay is set in accordance with: (a) the sample rate of the ADC, (b) the pulse repetition rate of the measure UV pulses and (c) a specified measurement accuracy. In particular, the decay rate is set such that, at the sample rate of the ADC and the pulse repetition rate of the UV pulses being measured, for each UV pulse the ADC will sample the integrator output at least once in the time between the integrator output reaching maximum and the time the integrator output decays more than the acceptable error. Once the integrator is sampled by the ADC, the digitized value is fixed, thereby eliminating the bleed-off problem of sample-and-reset integrator devices.

Preferably, the decay rate of the lossy integrator is set sufficiently low that the integration result maintains within an acceptable error for an interval of time substantially longer than the duration of the pulse. Since the ADC samples the integrator output at least once during this time, one aspect provides measurement of per-pulse energy, which not available from sample-and-reset devices, at a sampling rate significantly lower than the sampling rate required for a direct, multiple sample-per-pulse, energy measurement.

According to one aspect, the decay rate of the lossy integrator is set sufficiently high that, at least with a given statistical probability, during the time interval between the end of one pulse and the beginning of its successor pulse, the integrator result decays to an acceptable zero, or by a predetermined percentage. This aspect provides a measurement of pulse energy, over substantially any length of window, One aspect qualifies samples of the accumulated value to detect successive ADC samples of the accumulated value that correspond to the same pulse, to select only the largest sample. A feature of this aspect is that the largest ADC sample among the successive samples is the sample closest to the maximum of the lossy integrator output corresponding to the pulse and, therefore, is the sample most accurately representing the energy of the pulse.

One aspect generates a total accumulated energy value based on the digital sum of the ADC samples.

One aspect stores a running record of the ADC samples of the lossy integrator, compares each new sample with its immediate predecessor, and adds to the accumulated total energy only ADC samples reflecting an increase with respect to their immediate predecessor. This aspect provides measurement of UV pulse energy for closely spaced pulses such as, for example, UV pulses from multiple asynchronous UV sources.

DETAILED DESCRIPTION OF ILLUSTRATIVE EMBODIMENTS

The detailed description is of specific examples of embodiments, referring to the attached drawings. The specific examples are presented for illustration, and are not limiting.

The described embodiments relate generally to measuring a total energy of a received energy pulse such as, for example, a light pulse. Aspects of one more embodiments provide measurement of the total energy of pulses that may have very narrow time width such as, for example, microsecond (μS) or less.

One or more embodiments measure a total energy of a UV light pulse. The term "UV" has the ordinary and customary meaning in the relevant art and, as known in the art, may include sub-bands such as, for example, "UVA", "UVB."

Examples of one or more embodiments may be implemented by off-the-shelf circuit components, without requiring high speed, multiple sample-per-pulse, sampling circuits.

One embodiment comprises a photo-detector, a lossy integration circuit to integrate the output of the photo-detector, a digital-to-analog (D/A) sampler for sampling the output of the lossy integration circuit at a specified sampling rate SR, and a digital signal processing unit for receiving the D/A samples, and having instruction for performing described processing, storage and display features.

According to one aspect, the lossy integration circuit is constructed and arranged to generate a running accumulation of the pulse energy with respect to time until cessation of the pulse, and then to decay, the decay being quick enough to decay to an acceptable zero before receiving the next pulse, but slow enough to maintain a value within a given acceptable error of the maximum value for one sampling time period.

In one embodiment, the output of the sampler is connected to a processor such as, for example, a programmable processor having machine readable instruction embodied in a storage medium, which converts the sampled output to an accumulated total energy or a pulse energy data.

According to one aspect, pulse energy data, an accumulated total energy or, for example, a running average of the pulse energy data may be displayed. According to further aspects, display criteria may be entered such that pulse energy data meeting specified criteria are displayed.

One example embodiment has a processor with instructions, or an equivalent function implemented by other circuitry, to detect whether or not successive samples of the same energy pulse are samples of two separate pulses.

According to one aspect, an example sample qualifier detects occurrence of successive samples of the same energy pulse and qualifies only the last sample of the succession, to reduce error. In one aspect, the sample qualifier detects whether or not there is a decrease between successive sampler outputs and, in the absence of detecting a decrease, discards the output of the sampler.

Figure 2:
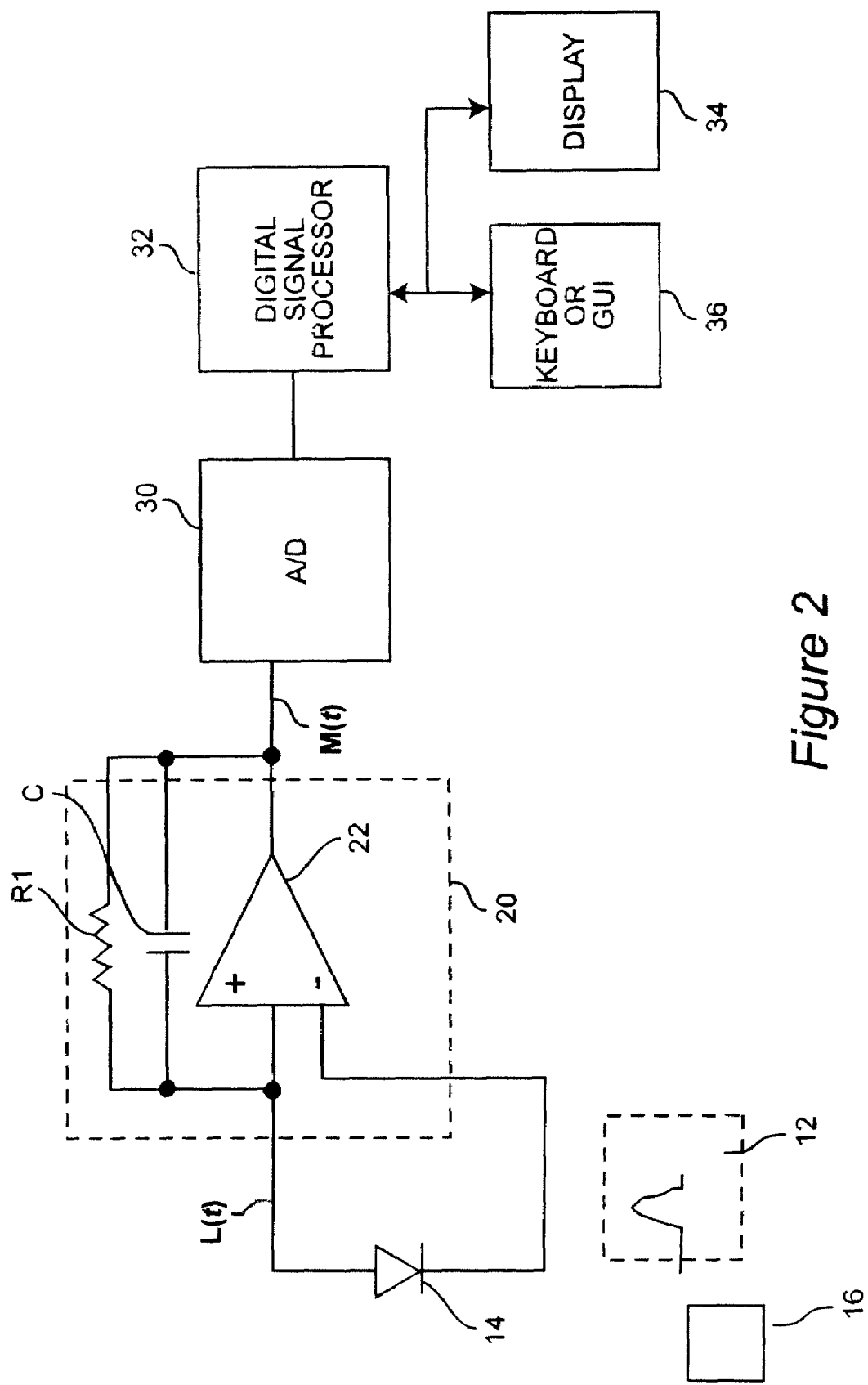
FIG. 2 schematically illustrates one example system according to one embodiment, and for performing methods according to one or more embodiments, for measuring a pulse energy.

FIG. 2 schematically illustrates a system 10 that incorporates one or more embodiments to measure a total energy per pulse of externally generated light pulses 12 received at a photo-detector 14 from one or more external light sources, referenced generally as light source 16 and to the measurement at a display 34.

Figure 1:
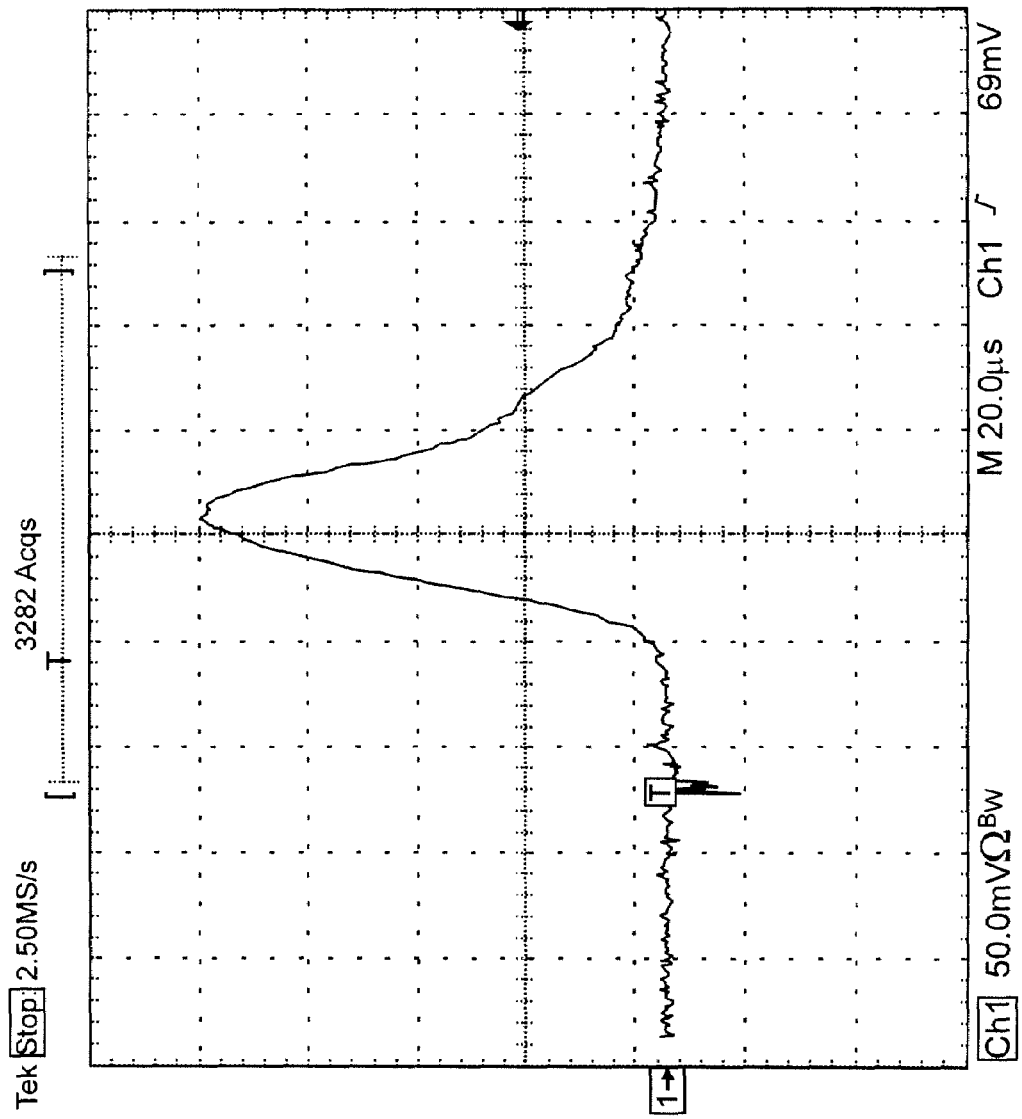
FIG. 1 is a graphical representation, as an amplitude-versus-time plot, of one example UV pulse output by a commercially available xenon pulse UV source.

With continuing reference to FIG. 2, the light pulses 12 may, for example, be UV pulses. The light pulses 12 may have an amplitude-versus-time comparable, for example, to the FIG. 1 illustrative example pulse form, without limitation as to pulse width or amplitude. The specific power output (e.g., maximum pulse power and pulse width) of the source(s) 16 and the specific frequency of the light pulses 12 are chosen according to the application. The selection criteria are well known to persons of ordinary skill in the relevant art.

One implementation of the light source 16 may, for example, be a conventional, off-the-shelf industrial pulsed UV source, employing a xenon tube such as, for example, a Model "RC 600B", available from Xenon Corp, or equivalents available from various commercial vendors known to persons skilled in the relevant arts.

Referring to FIG. 2, the photo-detector 14 output signal (say L(t)) is proportional to or representative of the energy of the light, e.g., light pulse 14, received by the photo-detector 14 at time t. The photo-detector 14 may be an off-the-shelf UV photo-detector such as, for example "51226-18/BU" available from Hamamatsu, or equivalents available from various commercial vendors known to persons skilled in the relevant arts. If desired, to control sensitivity of the photo-detector or reduce effects of light not of interest, the photo-detector may be covered with an attenuating optical filter (not shown), and the filter may be frequency-selective.

With continuing reference to FIG. 2, the output of the example photo-detector 14, labeled as L(t), connects to a lossy integrator 20 comprising, for example, an operational amplifier 22, a feedback/leakdown resistor R1, and a capacitor C, to output M(t). The output M(t) is sampled by, for example, an analog-to-digital converter (ADC) 30 at a sampling rate SR. The M(t)/L(t) transfer characteristic of the lossy integrator 20 may be modeled as:

$$M(t) \approx e^{-t/R_1 C} \frac{1}{C} \int L(t) dt \qquad \text{(Equation No. 1)}$$

The approximation sign "≈" is not a limitation or feature; it accounts for typical non-ideal characteristics of components such as, for example, the operational amplifier used for 22. Basically, M(t) is a running integral of L(t) that leaks toward zero, with an exponential time constant equal to the product of $R_1$ and C. The time constant $R_1C$ is selected based on three interrelated criteria: the sampling rate SR of the ADC 30, the pulse width PW, and the maximum acceptable error between the maximum value of M(t) and the decayed value of M(t) at the time of sampling. If the decay rate of M(t) is too fast with respect to the sampling rate SR then, statistically, for some pulses 12 the lossy integrator output M(t), after integrating to a maximum showing the total energy of the pulse, will have decayed excessively before it is sampled. If the $R_1C$ decay rate is too slow the lossy integrator output M(t) will not, in the time between the end of one pulse and the beginning of the next, have discharged to its level immediately preceding the first pulse. The lossy integrator 20 will then have less headroom for integrating the second pulse. If the $R_1C$ decay is set much too low the lossy integrator 20 may saturate when measuring closely spaced light pulses.

The $R_1C$ time constant is therefore selected dependent on the particular UV generation being measured, namely the number of sources, their respective pulse width(s) repetition frequency(ies). A person of ordinary skill in the art can readily select an appropriate $R_1C$ time, based on these factors, upon reading this disclosure.

One illustrative example implementation of the lossy integrator 20 comprises a model "AD8542AR" operational amplifier, available from Analog Devices, or an equivalent, a 2 MΩ resistor implementing $R_1$, and a 1200 pF capacitor implementing C. These are only illustrative example values. Other component types, vendors, and values will be readily apparent to persons skilled in the art upon reading this disclosure.

One illustrative example implementation of the ADC 30 is a model "LT1865" eight-bit ADC, available from various commercial vendors, or an equivalent. This is only an illustrative example. Other off-the-shelf and custom implementations will be readily apparent to persons skilled in the art upon reading this disclosure.

Equation No. 1 is not a limitation as to M(t); it is an example mathematical characterization of one example transfer function of M(t)/L(t), in reference to the particular example implementation of the lossy integrator 20 shown in FIG. 2. Further, the example topology and configuration of the lossy integrator circuit 20 depicted in FIG. 2 is only an example, and not limitative as to implementations according to the invention and its appended claims. Other circuit topologies for carrying out a lossy integration function to implement embodiments according to the appended claims will be readily apparent to persons skilled in the art upon reading this disclosure. Such alternate implementations and embodiments of the lossy integrator 20 will have a specific modeling function different from Equation No. 1, readily determined by a person of ordinary skill in the art.

Figure 3:
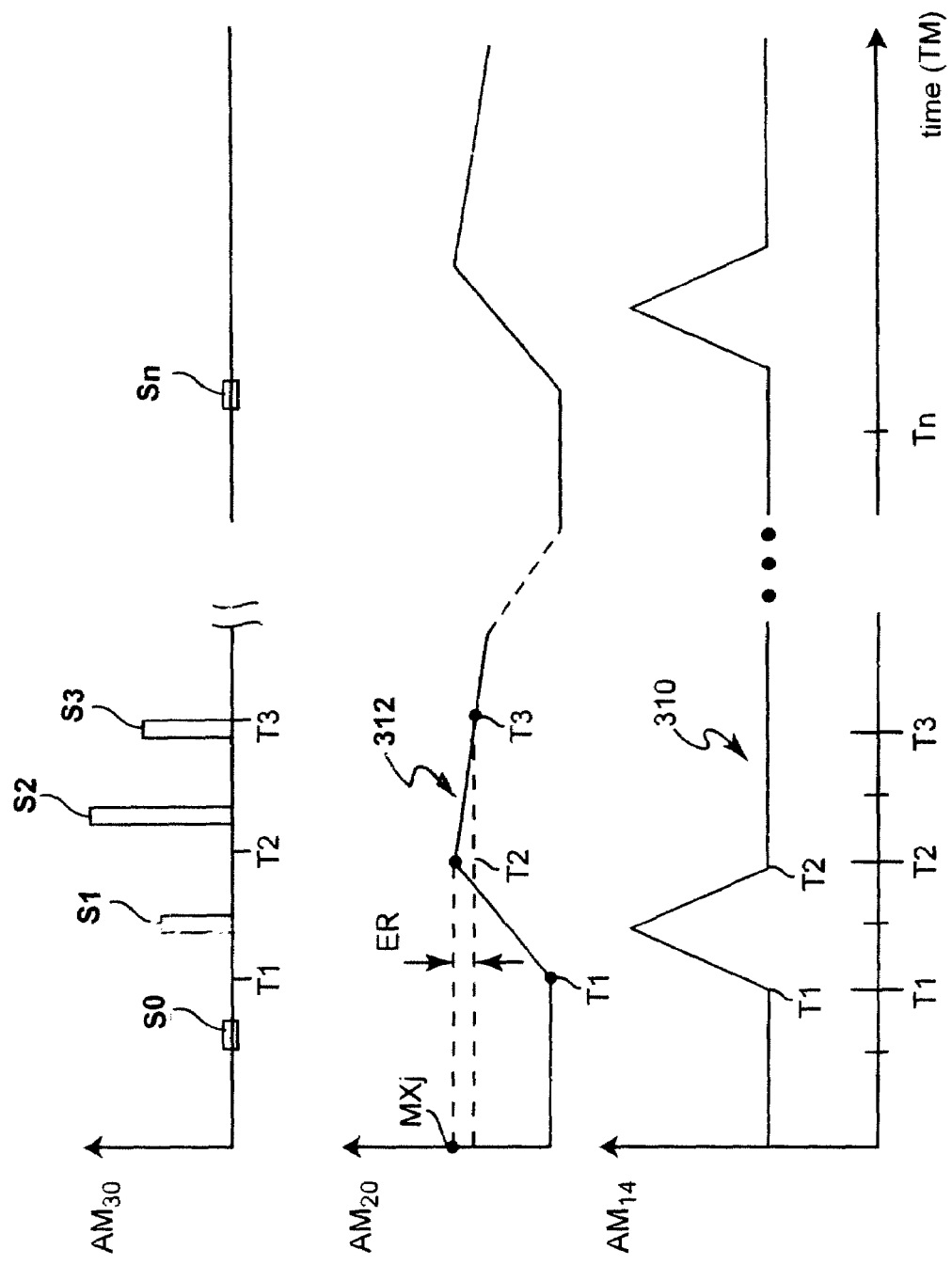
FIG. 3 is a timing diagram graphically illustrating one example lossy integration and sampling of energy pulses, according to one illustrative embodiment.

FIG. 3 graphically illustrates an example M(t)/L(t) in general accordance with Equation No. 1 and with the example lossy integrator 20 of FIG. 2. Referring to FIG. 3, the example M(t) 310 corresponds to a sequence of generally triangular envelope pulses (e.g., FIG. 2 pulse 12) impinging on the photo-detector 14, to generate a corresponding triangular L(t) labeled as 312. The horizontal axis TM represents time; the vertical axis $AM_{14}$ represents a relative amplitude of the L(t) output of the photo-detector 14; the vertical axis $AM_{20}$ represents a corresponding amplitude of the lossy integrator 20 output M(t), labeled 310 on FIG. 3, and $AM_{30}$ represents the relative amplitude of the samples Sn output by the ADC 30.

Referring to FIG. 3, the illustrated example photo-detector signal 312 has one start at $T_1$ and a corresponding end at $T_2$. Prior to $T_1$ the M(t) signal 310 is shown as zero valued. The illustrated zero value prior to $T_1$ assumes that the time constant, namely the product of C and $R_1$, is such that the M(t) from the immediately previous pulse has leaked to the indicated zero. It will be understood that the "zero value" prior to $T_1$ is only a relative value, against which the increase in M(t) due to the photo-detector signal starting at $T_1$ is measured. Depending on the implementation, the actual value of M(t) immediately prior to $T_1$ may consistently be a non-zero offset voltage (not shown) of the lossy integrator 20. Alternatively, the $R_1C$ time constant of the lossy integrator 20 may be such that, even assuming regularly spaced UV pulses, M(t) from one pulse does not decay to an actual zero before the next pulse and, instead, decays only to a given non-zero voltage.

With continuing reference to FIG. 3, the example M(t) 310 begins to increase at the $T_1$ pulse start and continues to increase until the pulse ends at $T_2$. The increase is a ramp representing a running integral of the example L(t) 312, over the pulse width $T_1$, $T_2$. The value of M(t) 310 at $T_2$ is MX and, since this reflects an integral over the entire example pulse L(t) 312, it is proportional (by $1/CR_1$) to the total energy of the pulse. Beginning at $T_2$ the signal M(t) 312 decays down from MX in an approximately exponential manner, referring to Equation No. 1, with a time constant of $CR_1$. The output M(t) is successively sampled by the ADC 30, and example samples are labeled in FIG. 3 as S0, S1, S2, S3 . . . Sn.

Referring to FIG. 2, the ADC 30 output S1, S2, S3 . . . Sn connects to a digital signal processor (DSP) 32, which may be a conventional, general purpose programmable digital processor having, for example, an instruction program memory, an instruction program stored in the memory, circuitry for executing the instruction program, a data storage, and input/output ports, and an internal data and instruction bus. The DSP 32 may be a single-chip digital signal processor such as, for example, a Texas Instruments model "TMS320VC5507" or equivalent available from various commercial vendors, as known by persons of ordinary skill in the relevant art.

According to one embodiment, the DSP 32 stores instructions for comparing successive samples Sn to select, for each pulse 12, the largest sample Sn.

Referring to FIG. 3, one example instruction sequence for the DSP 32 to select the largest ADC 30 sample will be described, in reference to the illustrated example sample sequence S0, S1, S2, S3 . . . Sn. The first sample S1 occurs between $T_1$ and $T_2$, during an "on" time of an example pulse 12 (FIG. 2) The next sample S2 occurs after the pulse end at $T_2$, by which time M(t) peaked at its maximum MXj ("j" being an index that associates MX with a particular pulse) and has decayed to MXj-ER. The value "ER" is the time constant $R_1C$ multiplied by the actual time, in seconds, between the pulse end at $T_2$ and the sample time of S2. The DSP 32 instructions instruct the processor 32 to compare the successive samples S2 and S1 and, since S2 is larger than S1 the DSP 32 discards S1 as an interim integration value. Next, the DSP 32 receives sample S3 and, according to its stored instructions, compares S3 and S2. S3 is smaller than S2 because of no additional light energy since S2, reflected by the decay of M(t). The DSP 32 therefore qualifies S2 as a sample. The DSP 32 instructions may also be configured to instruct the DSP to add the S2 sample to a running total of previous samples Sn, reflecting a total energy accumulated over a plurality of pulses (labeled as, e.g., Total_EG).

Referring to FIG. 2, a display 34 may be connected to the DSP 32 for displaying measured pulse data. The instructions for displaying data may be input through a user interface 36 such as, for example a keyboard, button or touch pad, or an inter-active display screen (not shown). Example instructions include, without limitation, a total energy accumulated over a plurality of pulses, e.g., Total_EG, and an average of the per-pulse pulse energies over, for example, a sliding window of selectable width. Other example instructions include a maximum pulse energy and a minimum pulse energy measured over a selectable width sliding window, and a variance of pulse energy. A person of ordinary skill in the relevant art can readily write such instructions for a standard digital signal processor upon reading this disclosure.

Figure 4:
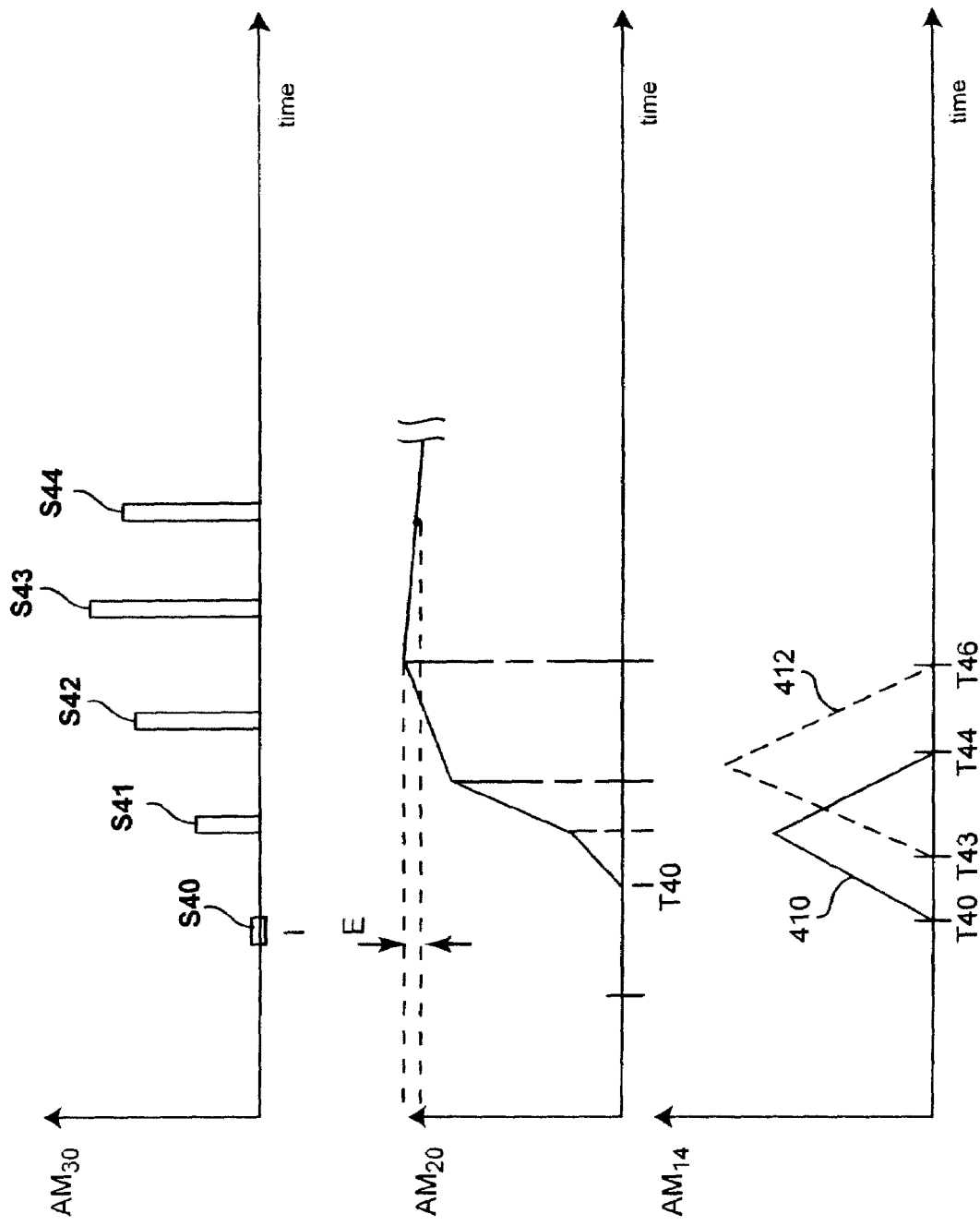
FIG. 4 is a timing diagram graphically illustrating one example lossy integration and sampling of overlapping energy pulses, according to one illustrative embodiment.

Referring to FIG. 4, an aspect of an embodiment according to FIG. 2 provides measurement of pulses 12 received from multiple light sources 16 and, if the multiple pulses simultaneously impinge on the photo-detector 14, the resulting sample is the total energy of the combined pulses. Referring to FIG. 4, pulse 410 is from one source 16 and pulse 420 is from another source 16. Pulse 410 starts at time T40 and ends at time T42. Pulse 412 starts at time T44 and ends at time T46. Samples S40, S41, S42 and S43 occur while one or both of the pulses 410 and 412 are received. Referring to FIG. 4, M(t) begins to increase at time T40, due to accumulating the pulse 410 energy. At time T44 the added energy of pulse 412 increases the rate at which M(t) increases, because the lossy integrator circuit 20 is now accumulating the combined energy of pulses 410 and 412. At time T42 pulse 410 ends, whereupon M(t) continues to increase due to pulse 412 alone, but at a lower rate. At time T46 pulse 412 ends, whereupon M(t) decays at a rate set by, referring to the FIG. 2 example lossy integrator 20, the product of $R_1$ and C.

With continuing reference to FIG. 4 and to the above-described instruction sequence performed by the DSP 32, sample S42 is larger than sample S40, so S40 is discarded. Sample S44, which is of M(t) after pulse 410 has ended but while pulse 412 still continues, is larger than sample S42, so sample S42 is also discarded. Sample S46, though, was made after pulse 412 ended, and M(t) has therefore decayed since the sample instant of S44. Sample S44 is therefore qualified and stored as a valid pulse energy measurement. Sample S44 is of M(t) after integrating pulse 410 and 412, but decaying by E in the time interval between T46, when the later pulse 412 ended, and the sampling instant of S44. The sample S44 reflects the integrated total energy of pulse 410 and 412, within the error E, even though the pulses overlapped in time.

Figure 5:
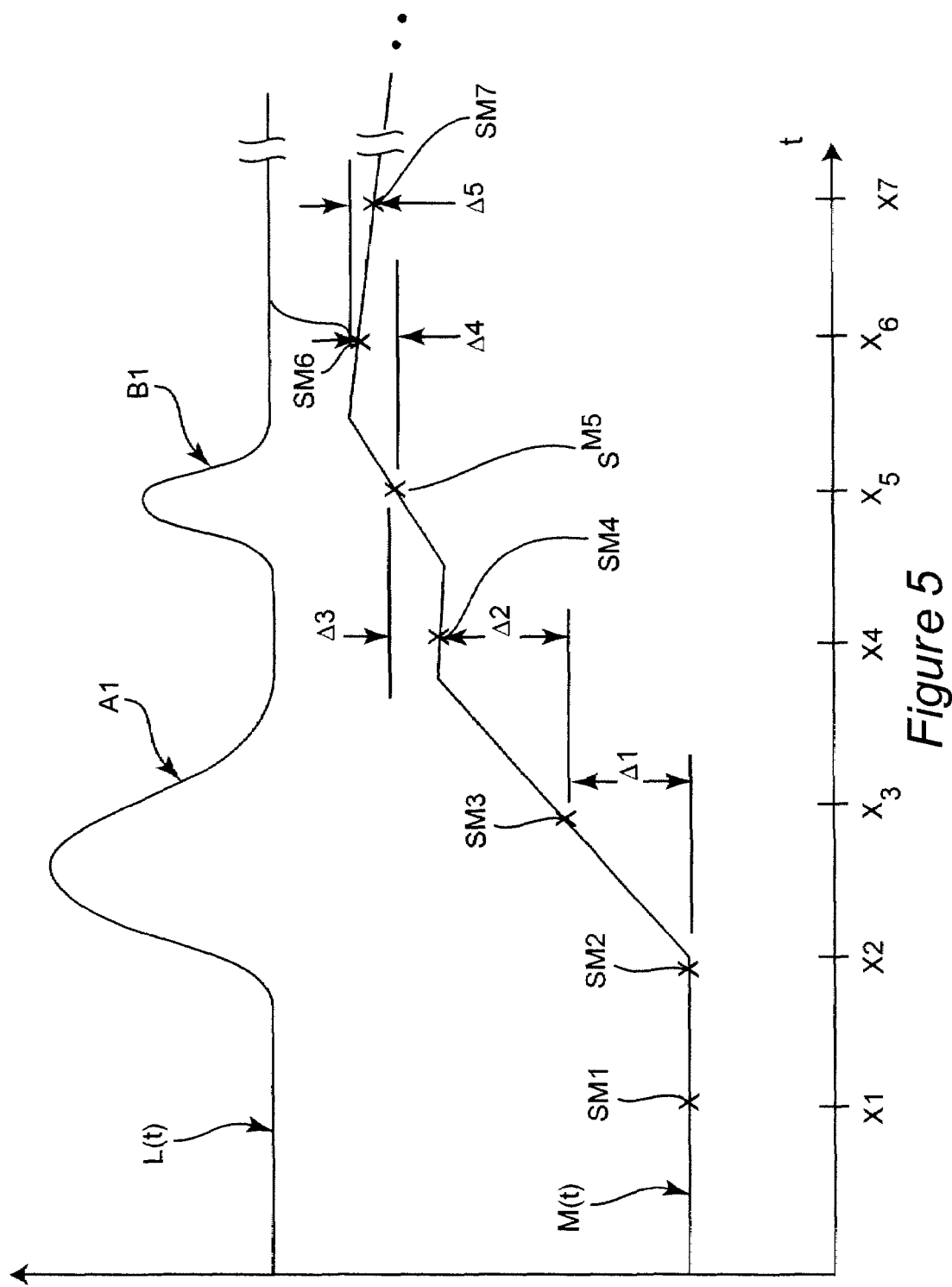
FIG. 5 is a timing diagram graphically illustrating one example lossy integration, sampling and accumulation of energy pulses, according to one illustrative embodiment It will be understood that graphical representations in the drawings have not necessarily been drawn to scale or to represent specific physical size. For example, some graphics may be larger or smaller for legibility.

FIG. 5 shows a timing diagram of another embodiment, which may be implemented by, for example, modifying the instructions in the DSP described above in reference to FIGS. 3 and 4. Description assumes a Total_EG value stored in the DSP 32. Referring to FIG. 5, the top graph illustrates a light pulse B1, followed by a light pulse A1, received at the photodetector 14, and the bottom graph illustrates a corresponding L(t) output by the photodetector 14 and the lossy integration M(t) of L(t). L(t) is simplified as having a rectangular form. ADC 32 sample are shown as successive "X" marks overlaid on M(t), labeled as SM1, SM2 . . . SM7. The samples SM1, SM2 . . . SM7 are taken at times X1, X2 . . . X7. At time X1 M(t) is at a starting value, which may be zero or non-zero as described. The ADC sample SM1 therefore corresponds to the starting value. At time X2, ADC sample SM2 is taken, and compared to SM1. The comparison may, for example, be a digital subtraction performed by DSP 32. As seen from the FIG. 5 graph, the difference of SM2−SM1 is small. The DSP 32 may use a threshold difference such as, for example, ΔTHLD (not shown on FIG. 5). The threshold ΔTHLD is not essential, but may prevent repeated small positive excursions of M(t) from being falsely counted, as will be understood from the description.

With continuing reference to FIG. 5, the difference of SM2−SM1 is less than ΔTHLD. DSP 32 therefore takes SM2 as a new reference for detecting positive excursions of M(t), but does not update the Total_EG value. From X2 to X3, though, M(t) has increased as a ramp, reflecting the integral of L(t) from X2 to X3. At time X3, when sample SM3 is taken, SM3−SM2 (shown as Δ1) is positive. The DSP 32 therefore adds Δ1 to Total_EG, i.e., Total_EG=(Total_EG+Δ1). The DSP 32 sets SM3 as the new reference. At time X4, sample SM4 is taken. SM4−SM3, shown as Δ2, is positive. The DSP 32 therefore adds Δ2 to Total_EG, i.e., sets Total_EG=(Total_EG+Δ2). SM4 is the new reference. As shown in FIG. 5, at time X4 when the sample SM4 of M(t) is taken, M(t) had already decayed from its maximum. As described, the maximum of M(t) corresponding to the integration of pulse A1 reflects the total energy in the pulse A1. However, because of the $R_1C$ time constant and sampling rate SR, the M(t) decay at time X4 is within the acceptable error.

Referring to FIG. 5, from time X4 to time X5, light pulse A1 ends but, before M(t) can decay to its value at X2, preceding A1, new pulse B1 arrives. At time X5, sample SM5 is taken and compared to SM4. The difference (SM5−SM4), shown as Δ3, is positive, and the DSP 32 therefore adds Δ3 to Total_EG, i.e., sets Total_EG=(Total_EG+Δ3). SM5 is the new reference. With continuing reference to FIG. 5, from time X5 to time X6, light pulse A1 ends and M(t) has decayed from its value at X5. Therefore, at time X6, when sample SM6 is taken and compared to SM5, the difference (SM6−SM5), shown as Δ5, is negative. DSP 32 therefore does not add Δ4 to Total_EG. Total_EG is therefore not updated at time X6. The sample SM6, however, is taken as the new reference for detecting positive excursions.

While certain embodiments and features of the invention have been illustrated and described herein, many modifications, substitutions, changes, and equivalents will occur to those of ordinary skill in the art. It is therefore to be understood that the appended claims are intended to cover all such modifications and changes as fall within the spirit of the invention.

We claim:

1. A method for measuring UV pulse total energy, comprising the steps of:
   detecting a UV pulse having a pulse duration and a pulse total energy at a photo-detector to generate a light detection pulse signal L(t), having a approximately said pulse duration;
   integrating the light detection pulse signal L(t) with a lossy integrator to generate a running integration signal M(t) that increases over time for approximately said pulse duration to maximum value, and then decays with respect to time, with a given decay rate over a given interval, wherein the maximum is based on the UV pulse total energy, wherein said lossy integrator is composed of an operational amplifier having positive and negative inputs and an output, a feedback leakdown resistor $R_1$ connected between said output and said negative input and a capacitor C connected between said output and said negative input, said photo-detector being connected across said positive and negative inputs;
   sampling said running integration signal M(t) from the lossy integrator with an analog-to-digital converter to generate a corresponding digital measurement sample, wherein the M(t)/L(t) transfer characteristic of the lossy integrator is $$M(t) \approx e^{-t/R_1 C} \frac{1}{C} \int L(t) dt$$

where M(t) is a running integral of L(t) that leaks towards zero with an exponential time constant of $R_1C$, the time constant $R_1C$ being selected based on a sampling rate of the analog-to-digital converter, the pulse duration of a UV light pulse to be detected and a maximum acceptable error between a maximum value of M(t) and a decayed value of M(t) at a time of sampling by the analog-to-digital converter;

processing the digital measurement sample in a digital signal processor circuit, said digital signal processor having an instruction program memory, a processor for executing an instruction program stored in the instruction program memory, a data storage for storing measured UV pulse energy values, an input port connected to an output of the analog-to-digital converter for receiving the digital measurement samples, and an input/output port for outputting data from said data storage and inputting instructions to said instruction program memory;

displaying measured UV pulse data on a display connected to the input/output port of the digital signal processor; and receiving user instructions via a user interface connected to the input/output port of the digital signal processor, the user instructions being stored in the instruction memory of the digital signal processor.

2. The method of claim 1, wherein said step of sampling with an analog-to-digital converter includes a successive sampling of said running integration signal M(t) to generate a sequence of digital measurement samples.

3. The method of claim 2, further comprising the steps of:
determining by the digital signal processor whether successive digital measurement samples from said sequence of said digital measurement samples correspond to the same received UV light pulse; and
selecting by the digital signal processor a pulse total energy data from among said successive digital measurement samples.

4. The method of claim 3, wherein said step of selecting by the digital signal processor selects the largest from among said successive digital measurement samples as the pulse total energy data.

5. An apparatus for measuring UV pulse energy, comprising:
a photo-detector to receiving a UV light pulse having a pulse duration and a pulse total energy, and to output a corresponding light detection pulse signal L(t) having approximately said pulse duration;
a lossy integrator circuit constructed and arranged to receive the light detection pulse signal to generate, in response to said pulse signal, a running integration signal M(t) that increases with respect to time for approximately said pulse duration to a maximum value, and then decays with respect to time, with a given decay rate over a given interval, wherein the maximum is based on the pulse total energy, wherein said lossy integrator is composed of an operational amplifier having positive and negative inputs and an output, a feedback leakdown resistor $R_1$ connected between said output and said negative input and a capacitor C connected between said output and said negative input, said photo-detector being connected across said positive and negative inputs;
an analog-to-digital converter connected to receive the output M(t) from the lossy integrator circuit to sample said running integration signal and to generate a corresponding digital measurement sample, wherein the M(t)/L(t) transfer characteristic of the lossy integrator is $$M(t) \approx e^{-t/R_1 C} \frac{1}{C} \int L(t) dt$$

where M(t) is a running integral of L(t) that leaks towards zero with an exponential time constant of $R_1C$, the time constant $R_1C$ being selected based on a sampling rate of the analog-to-digital converter, the pulse duration of a UV light pulse to be detected and a maximum acceptable error between a maximum value of M(t) and a decayed value of M(t) at a time of sampling by the analog-to-digital converter;

a digital signal processor circuit, said digital signal processor having an instruction program memory, a processor for executing an instruction program stored in the instruction program memory, a data storage for storing measured UV pulse energy values, an input port connected to an output of the analog-to-digital converter for receiving the digital measurement samples, and an input/output port for outputting data from said data storage and inputting instructions to said instruction program memory; and a display and a user interface connected to the input/output port of the digital signal processor, the display displaying measured UV pulse data and the user interface receiving user instructions to be stored in the instruction memory of the digital signal processor.

6. The apparatus of claim 5, wherein said analog-to-digital converter is arranged to perform a successive sampling of said running integration signal to generate a sequence of said digital measurement samples.

7. The apparatus of claim 5, wherein said digital signal processor determines whether successive digital measurement samples correspond to the same received light pulse and selects a pulse total energy data from among said successive digital measurement samples.

8. The apparatus of claim 7, wherein said digital signal processor initializes a total energy data and updates said total energy based, at least in part, on measured UV pulse total energy data.

9. The apparatus of claim 5, wherein said said digital signal processor a total energy data and compares a successive first and second of said digital measurement samples and, if the second is greater than the first, updates said total energy based, at least in part, on the second digital measurement sample and, if the second is less than the first, does not update the total energy data.

* * * * *